US009900938B2

(12) United States Patent
Kim et al.

(10) Patent No.: US 9,900,938 B2
(45) Date of Patent: Feb. 20, 2018

(54) LED LIGHTING CIRCUIT WITH RIPPLE REDUCER

(71) Applicant: FAIRCHILD KOREA SEMICONDUCTOR LTD., Bucheon (KR)

(72) Inventors: Jintae Kim, Seoul (KR); Hyunchul Eum, Seoul (KR); Inki Park, Seoul (KR); Eungwoo Lee, Seoul (KR)

(73) Assignee: Fairchild Korea Semiconductor Ltd., Bucheon (KR)

(*) Notice: Subject to any disclaimer, the term of this patent is extended or adjusted under 35 U.S.C. 154(b) by 0 days.

(21) Appl. No.: 15/388,243

(22) Filed: Dec. 22, 2016

(65) Prior Publication Data

US 2017/0215238 A1    Jul. 27, 2017

Related U.S. Application Data

(60) Provisional application No. 62/287,081, filed on Jan. 26, 2016.

(51) Int. Cl.
*H05B 33/08* (2006.01)
*H02J 3/01* (2006.01)
*H02J 3/18* (2006.01)

(52) U.S. Cl.
CPC ............ *H05B 33/0812* (2013.01); *H02J 3/01* (2013.01); *H02J 3/18* (2013.01)

(58) Field of Classification Search
CPC .... H05B 33/02; H05B 33/08; H05B 33/0806; H05B 33/0812; H05B 33/0833; H05B 33/0836

USPC ........................ 315/291, 294, 297, 307–308
See application file for complete search history.

(56) References Cited

U.S. PATENT DOCUMENTS

| 7,750,616 | B2* | 7/2010 | Liu | H05B 33/0815 |
| | | | | 323/224 |
| 8,044,609 | B2* | 10/2011 | Liu | H05B 33/086 |
| | | | | 315/291 |
| 2011/0266969 | A1* | 11/2011 | Ludorf | H02M 1/4258 |
| | | | | 315/294 |
| 2012/0181941 | A1 | 7/2012 | Kimura et al. | |
| 2013/0307424 | A1* | 11/2013 | Gray | H05B 33/083 |
| | | | | 315/193 |
| 2013/0313991 | A1* | 11/2013 | Pan | H05B 33/0809 |
| | | | | 315/201 |

OTHER PUBLICATIONS

Inventronics—INV221 Ripple Suppress Controller for LED Lighting, Rev. A, Aug. 20, 2014, pp. 1-9.

(Continued)

*Primary Examiner* — Jason M Crawford
(74) *Attorney, Agent, or Firm* — Okamoto & Benedicto LLP (57) ABSTRACT

A light emitting diode (LED) lighting circuit includes a ripple reducer. The ripple reducer includes a ripple detector, an adaptive offset generator, and a linear regulator. The ripple detector generates a ripple voltage that is indicative of a ripple current. The adaptive offset generator generates an adaptive offset voltage from the ripple voltage and from a voltage of a transistor. The linear regulator drives the transistor to regulate an LED current in accordance with a reference control voltage that is generated from the ripple voltage and the adaptive offset voltage.

20 Claims, 9 Drawing Sheets

(56) References Cited

OTHER PUBLICATIONS

AN022 Richtek Technology—Minimizing Light Flicker in LED Lighting Applications, 12 pages [retrieved on Dec. 20, 2016], retrieved from the internet: http://www.richtek.com/Design%20Support/Technical%20Document/AN022.

* cited by examiner

LED LIGHTING CIRCUIT WITH RIPPLE REDUCER

CROSS-REFERENCE TO RELATED APPLICATION

This application claims the benefit of U.S. Provisional Application No. 62/287,081, filed on Jan. 26, 2016, which is incorporated herein by reference in its entirety.

BACKGROUND OF THE INVENTION

1. Field of the Invention

The present invention relates generally to electrical circuits, and more particularly but not exclusively to ripple reducers.

2. Description of the Background Art

As its name implies, a ripple reducer is an electrical circuit for reducing a ripple of a signal. In a light emitting diode (LED) lighting circuit, a ripple reducer is employed to reduce the ripple of an LED current through an LED array. The ripple reducer may comprise a linear regulator that senses the LED current from a sense resistor and drives a metal oxide semiconductor field effect transistor (MOSFET) to regulate and smooth the LED current. A problem with this ripple reducer topology is that the sense resistor increases the power loss of the LED lighting circuit. Another ripple reducer topology comprises a linear regulator that drives a bipolar junction transistor (BJT), instead of a MOSFET. The BJT does not require a sense resistor but has severe power loss due to the collector-to-emitter voltage of the BJT in the active region, because it is relatively difficult to automatically optimize the saturation voltage of the BJT.

SUMMARY

In one embodiment, an LED lighting circuit includes a ripple reducer. The ripple reducer includes a ripple detector, an adaptive offset generator, and a linear regulator. The ripple detector generates a ripple voltage that is indicative of a ripple current. The adaptive offset generator generates an adaptive offset from the ripple voltage and from a voltage on a node of a transistor. The linear regulator drives the transistor to regulate an LED current in accordance with a reference control voltage that is generated from the ripple voltage and the adaptive offset.

These and other features of the present invention will be readily apparent to persons of ordinary skill in the art upon reading the entirety of this disclosure, which includes the accompanying drawings and claims.

DESCRIPTION OF THE DRAWINGS

The use of the same reference label in different drawings indicates the same or like components.

DETAILED DESCRIPTION

In the present disclosure, numerous specific details are provided, such as examples of electrical circuits, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 1:
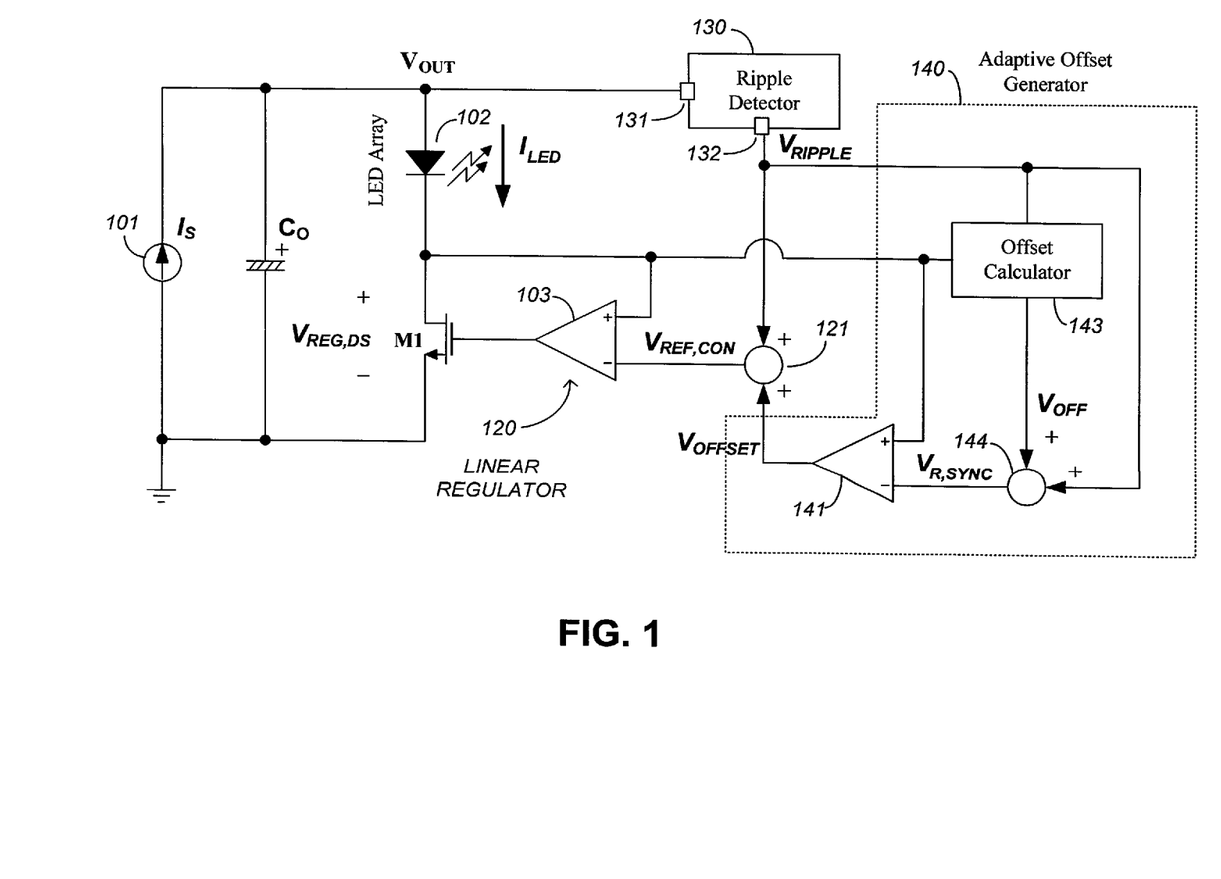
FIG. 1 shows a schematic diagram of an LED lighting circuit in accordance with an embodiment of the present invention.

FIG. 1 shows a schematic diagram of an LED lighting circuit 100 in accordance with an embodiment of the present invention. In the example of FIG. 1, the LED lighting circuit 100 comprises a constant-current sourcing converter 101 and a ripple reducer circuit, which comprises a ripple detector 130, an adaptive offset generator 140, and a linear regulator 120. In the example of FIG. 1, the linear regulator 120 comprises an amplifier 103 that drives a transistor M1. In the example of FIG. 1, the transistor M1 is a MOSFET. In other embodiments, the transistor M1 is a bipolar junction transistor. As will be more apparent below, the ripple reducer circuit reduces ripple current without necessarily requiring a sense resistor, and automatically minimizes power dissipation from saturation operation of the transistor M1.

In the example of FIG. 1, the constant-current sourcing converter 101 may comprise a power factor correction circuit (PFC). For example, the constant-current sourcing converter 101 may be a single-stage PFC rectifier that is based on a flyback converter with a constant-current source that generates a source current $I_S$. The output voltage VOUT of the constant-current sourcing converter 101 is developed across an output capacitor $C_O$. The source current $I_S$ flows through the LED array 102 as the LED current $I_{LED}$. The LED array 102 may comprise a plurality of series-connected LEDs. The source current $I_S$ has ripple, which may degrade the emission of the LED array 102 (e.g., cause flickering). The output capacitor $C_O$ reduces the amplitude of the ripple current that flows from the output capacitor $C_O$ and through the LED array 102. The larger the output capacitor $C_O$, the lower the ripple current. Embodiments of the present invention allow for reduction or elimination of ripple current without necessarily employing a sense resistor even with a relatively small output capacitor $C_O$.

The linear regulator 120 is configured to regulate the LED current $I_{LED}$ at a level dictated by the reference control voltage $V_{REF,CON}$ at the negative input of the amplifier 103. More particularly, the amplifier 103 drives the gate of the transistor M1 so that the drain-to-source voltage $V_{REG,DS}$ of the transistor M1 is the same as the reference control voltage $V_{REF,CON}$, thereby controlling the conduction of the transistor M1 to regulate and smooth the LED current $I_{LED}$.

The ripple detector 130 is an electrical circuit for detecting the ripple current. In the example of FIG. 1, the ripple detector 130 has an input node 131 that is connected to the positive node of the output capacitor $C_O$ to detect the output voltage VOUT and an output node 132 that is connected to an input of an adder 121. The ripple detector 130 detects the ripple voltage from the output voltage VOUT and outputs a ripple voltage $V_{RIPPLE}$, which is the ripple of the output voltage VOUT without DC offset. The ripple voltage $V_{RIPPLE}$ is thus representative of the ripple current.

Figure 2:
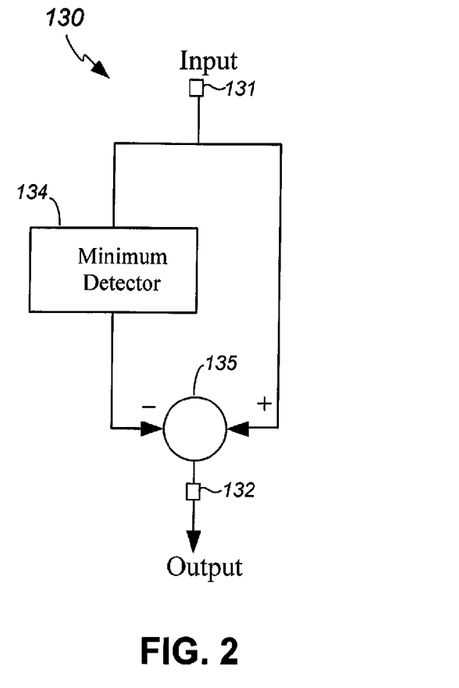
FIG. 2 shows a schematic diagram of a ripple detector in accordance with an embodiment of the present invention.

FIG. 2 shows a schematic diagram of a ripple detector 130 in accordance with an embodiment of the present invention. The ripple detector 130 may be implemented as an analog circuit, a digital circuit, or a combination of analog and digital circuits. In the example of FIG. 2, the ripple detector 130 comprises a minimum detector 134 and a subtractor 135. The minimum detector 134 detects the minimum value of the output voltage VOUT at the input node 131. The subtractor 135 subtracts the minimum value of the output voltage VOUT from the output voltage VOUT to generate at the output node 132 the ripple voltage $V_{RIPPLE}$, which has the same amplitude as the ripple of the output voltage VOUT but at zero-offset level.

Figure 3:
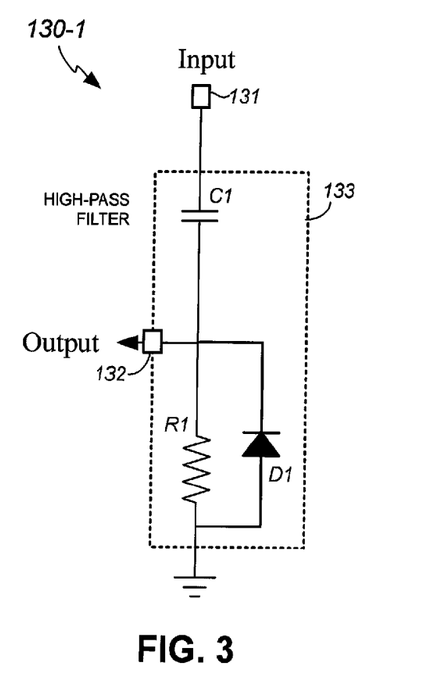
FIG. 3 shows a schematic diagram of an analog ripple detector in accordance with an embodiment of the present invention.

FIG. 3 shows a schematic diagram of a ripple detector 130-1 in accordance with an embodiment of the present invention. The ripple detector 130-1 is an example analog implementation of the ripple detector 130. In the example of FIG. 3, the ripple detector 130-1 comprises a high-pass filter 133, which comprises a capacitor C1, a resistor R1, and a diode D1. One end of the capacitor C1 is connected to the input node 131 (see also FIG. 1, 131) and an opposing end of the capacitor C1 is connected to the output node 132 (see also, FIG. 1, 132). Each of the resistor R1 and diode D1 has one end connected to the output node 132 and an opposing end connected to ground. The high-pass filter 133 filters out the DC component of the output voltage VOUT at the input node 131, leaving the AC component, i.e., the ripple voltage $V_{RIPPLE}$, at the output node 132.

Figure 4:
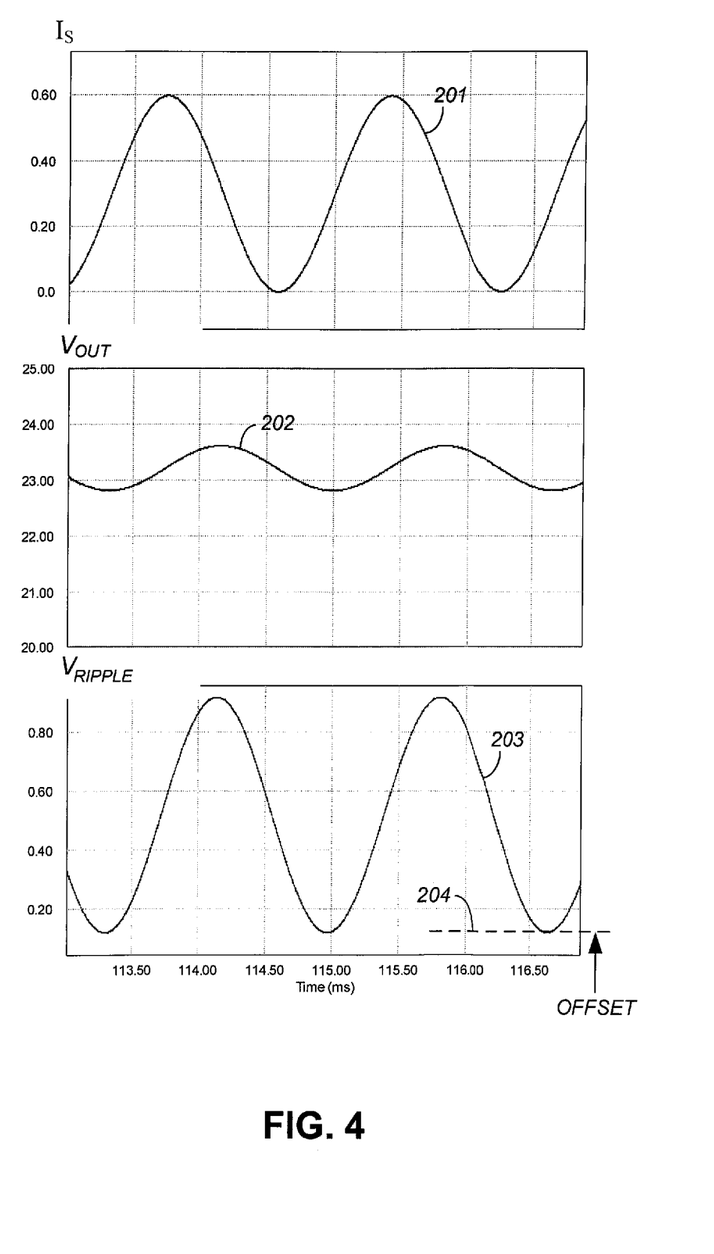
FIG. 4 shows waveforms of signals that are relevant to the operation of a ripple detector in accordance with an embodiment of the present invention.

FIG. 4 shows waveforms of the source current $I_S$ (plot 201) generated by the constant-current sourcing converter 101, the output voltage VOUT at the input node 131 (plot 202) of the ripple detector 130, and the ripple voltage $V_{RIPPLE}$ at the output node 132 (plot 203) of the ripple detector 130 in accordance with an embodiment of the present invention. As shown in FIG. 4, the ripple of the source current $I_S$ is reflected on the output voltage VOUT with 180 phase shift due to the output capacitor Co. The ripple of the output voltage VOUT is, in turn, reflected on the ripple voltage $V_{RIPPLE}$. Note that the ripple voltage $V_{RIPPLE}$ may have a DC offset (see 204).

Figure 5:
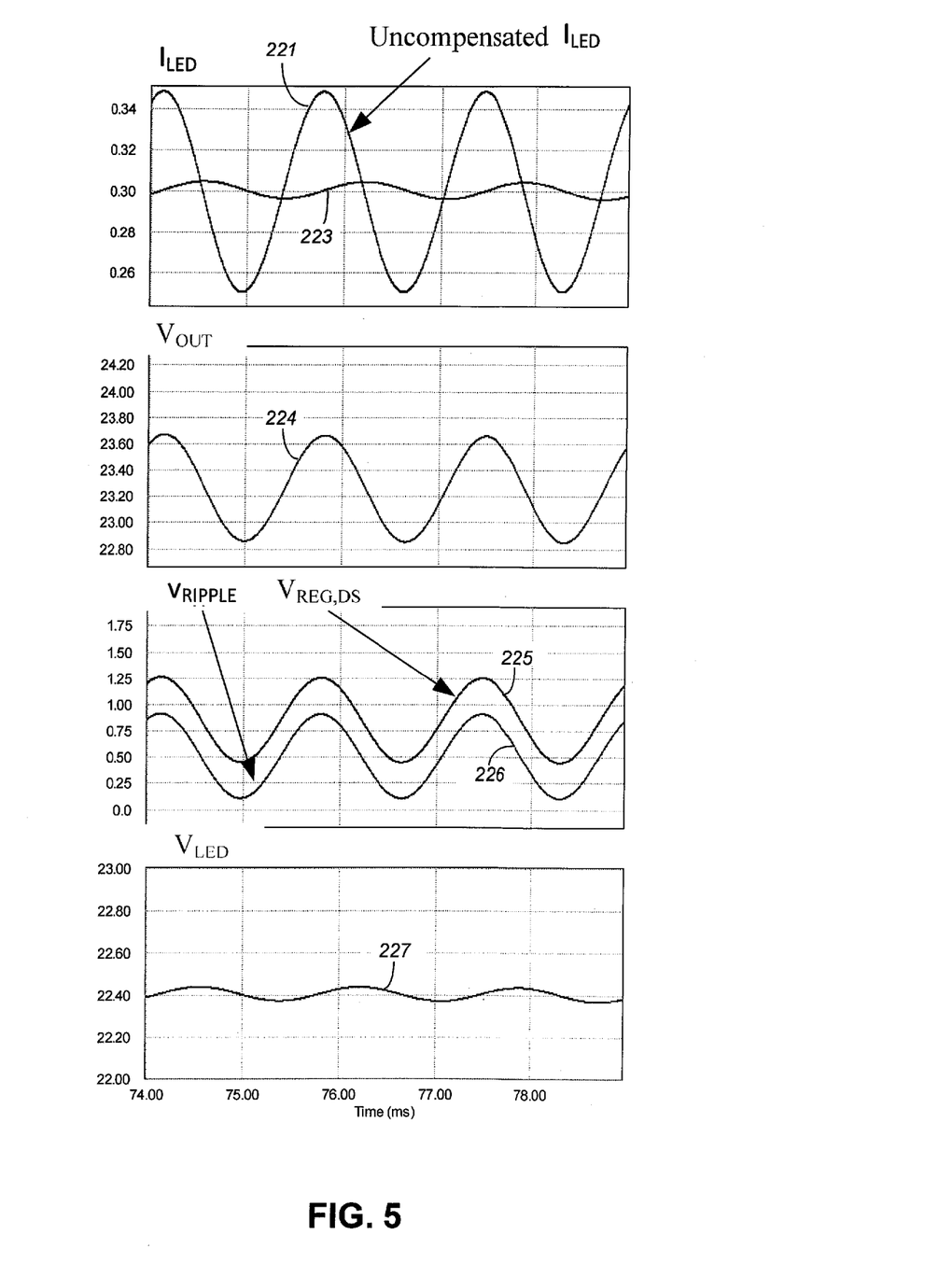
FIG. 5 shows waveforms of signals that are relevant to the operation of a linear regulator in accordance with an embodiment of the present invention.

FIG. 5 shows waveforms of signals that are relevant to the operation of the linear regulator 120 of FIG. 1, in accordance with an embodiment of the present invention. FIG. 5 shows waveforms of the LED current $I_{LED}$ through the LED array 102 (plot 223), the output voltage VOUT (plot 224), the drain-to-source voltage $V_{REG,DS}$ of the transistor M1 (plot 225), the ripple voltage $V_{RIPPLE}$ (plot 226), and the voltage $V_{LED}$ across the LED array 102 (plot 227). For comparison, FIG. 5 also shows the waveform of the LED current $I_{LED}$ without the ripple reducer circuit, i.e., uncompensated (plot 221).

As can be noted from FIG. 5, the ripple current results in ripple on the output voltage VOUT (plot 224). Without the ripple reducer circuit, the LED current $I_{LED}$ would have unacceptable ripple (plot 221) that would adversely affect the performance of the LED array 102 (e.g., cause flickering). The ripple reducer circuit reduces the ripple on the LED current $I_{LED}$ and the voltage $V_{LED}$ across the LED array 102. As can be further noted from FIG. 5, at all states, the ripple voltage $V_{RIPPLE}$ (plot 226) is the same as the drain-to-source voltage $V_{REG,DS}$ (plot 225) of the transistor M1 in terms of phase and amplitude. In the example of FIG. 5, the difference between the drain-to-source voltage $V_{REG,DS}$ (plot 225) and ripple voltage $V_{RIPPLE}$ (226) is due to the adaptive offset voltage $V_{OFFSET}$ generated by the adaptive offset generator 140. It is to be noted that in the example of FIG. 5, the gate-to-source threshold voltage of the transistor M1 is not taken into account because gate-to-source threshold voltage generally varies depending on the type of the MOSFET.

Figure 6:
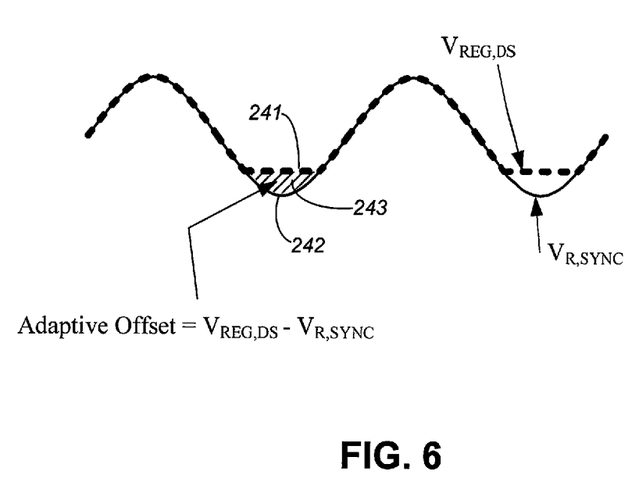
FIG. 6 shows waveforms of a drain-to-source voltage of a transistor with zero offset and a reference synchronization voltage generated by an adaptive offset generator in accordance with an embodiment of the present invention.

FIG. 6 shows waveforms of the drain-to-source voltage $V_{REG,DS}$ of the transistor M1 with zero offset (plot 241) and a reference synchronization voltage $V_{R,SYNC}$ (plot 242; (see also FIG. 1, output of adder 144) generated by the adaptive offset generator 140 in accordance with an embodiment of the present invention. In the example of FIG. 6, the clipped bottom peaks of the drain-to-source voltage $V_{REG,DS}$ (plot 241) is due to the transistor M1 operating out of the saturation region. In one embodiment, the adaptive offset generator 140 generates the reference synchronization voltage $V_{R,SYNC}$ from the ripple voltage $V_{RIPPLE}$ and controls the amplitude of the reference synchronization voltage $V_{R,SYNC}$ to be equal to that of the drain-to-source voltage $V_{REG,DS}$. The area 243 between the drain-to-source voltage $V_{REG,DS}$ and the reference synchronization voltage $V_{R,SYNC}$ indicates the minimum amount of offset to be added to the drain-to-source voltage $V_{REG,DS}$ to raise its minimum value so that the transistor M1 operates in the saturation region, thereby removing the area 243 and reducing ripple current. In one embodiment, the adaptive offset generator 140 generates an adaptive offset signal, in the form of an adaptive offset voltage $V_{OFFSET}$, to increase the drain-to-source voltage $V_{REG,DS}$ and allow the transistor M1 to operate in the saturation region.

In the example of FIG. 1, the adaptive offset generator 140 includes an offset calculator 143 and an adder 144. In one embodiment, the offset calculator 143 determines an amount of offset to be added to the ripple voltage $V_{RIPPLE}$ by the adder 144 so that the transistor M1 operates in the saturation region.

More particularly, the drain-to-source voltage $V_{REG,DS}$ increases as more offset is added to the ripple voltage $V_{RIPPLE}$. The increased drain-to source voltage $V_{REG,DS}$ increases power dissipation due to the larger saturation voltage. On the other hand, the smaller the offset voltage added to the ripple voltage $V_{RIPPLE}$, the smaller the drain-to-source voltage $V_{REG,DS}$, and the lower the power dissipation. A relatively small drain-to-source voltage $V_{REG,DS}$ allows the transistor M1 to fully turn ON, which causes the drain-to-source voltage $V_{REG,DS}$ to be equal to the source current multiplied by the drain-to-source ON resistance of the transistor M1 (i.e., Is*RDS(ON)). In the example of FIG. 1, this increases the adaptive offset voltage $V_{OFFSET}$ and thereby allows the transistor M1 to be operated in the saturation region.

As the adaptive offset voltage $V_{OFFSET}$ becomes too large, the drain-to-source voltage $V_{REG,DS}$ increases and so does the reference synchronization voltage $V_{R,SYNC}$ at the input of the amplifier 141. Accordingly, in that case, the adaptive offset voltage $V_{OFFSET}$, which is output by the amplifier 141, is gradually decreased to adaptively compensate. Advantageously, reduced ripple is obtained by operating the transistor M1 in the saturation region, and operation of the transistor M1 in the saturation region is adaptively controlled to minimize power dissipation.

Still referring to FIG. 1, the amplifier 141 receives the resulting reference synchronization voltage $V_{R,SYNC}$ at a negative input terminal and receives the drain-to-source voltage $V_{REG,DS}$ at a positive input terminal to generate the adaptive offset voltage $V_{OFFSET}$. The adder 121 adds the adaptive offset voltage $V_{OFFSET}$ to the ripple voltage $V_{RIPPLE}$ to generate the reference control voltage $V_{REF,CON}$ at the negative input terminal of the amplifier 103. The reference control voltage $V_{REF,CON}$ serves as a reference for the amplifier 103 in driving the transistor M1 to regulate the LED current with reduced ripple and minimized power dissipation. Advantageously, embodiments of the present invention do not require a sense resistor to perform the ripple reduction.

Figure 7:
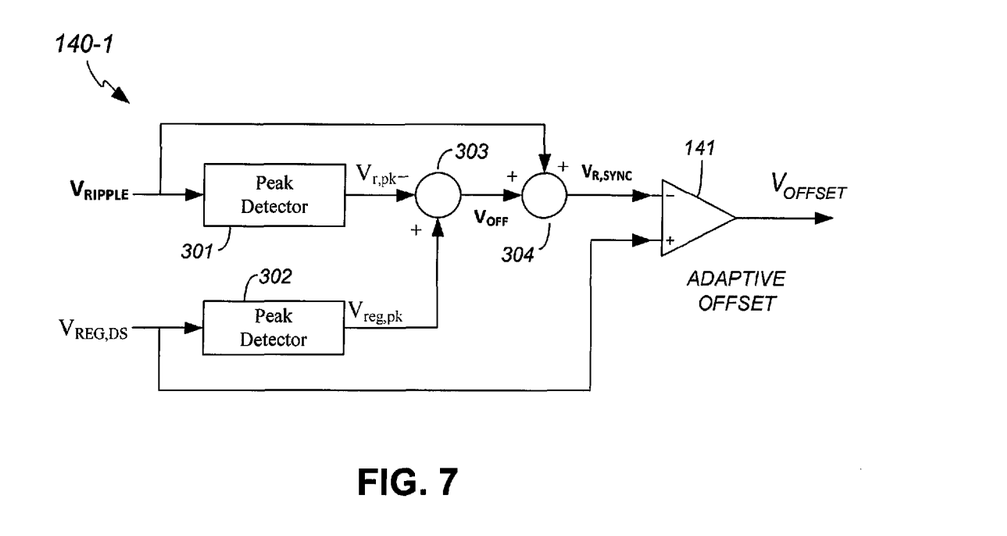
FIG. 7 shows a schematic diagram of an adaptive offset generator in accordance with an embodiment of the present invention.

FIG. 7 shows a schematic diagram of an adaptive offset generator 140-1 in accordance with an embodiment of the present invention. The adaptive offset generator 140-1 is an example implementation of the adaptive offset generator 140. The adaptive offset generator 140-1 may be implemented as an analog circuit, a digital circuit, or a combination of analog and digital circuits. In the example of FIG. 7, a peak detector 301 detects the peak of the ripple voltage $V_{RIPPLE}$ and a peak detector 302 detects the peak of the drain-to-source voltage $V_{REG,DS}$. A subtractor 303 subtracts the peak of the ripple voltage $V_{RIPPLE}$ from the peak of the drain-to-source voltage $V_{REG,DS}$ to generate an offset voltage $V_{OFF}$, which is added to the ripple voltage $V_{RIPPLE}$ by the adder 304 to generate the reference synchronization voltage $V_{R,SYNC}$. The amplifier 141 (see also FIG. 1, 141) receives the reference synchronization voltage $V_{R,SYNC}$ at the negative input terminal and receives the drain-to-source voltage $V_{REG,DS}$ at the positive input terminal to generate the adaptive offset voltage $V_{OFFSET}$.

Figure 8:
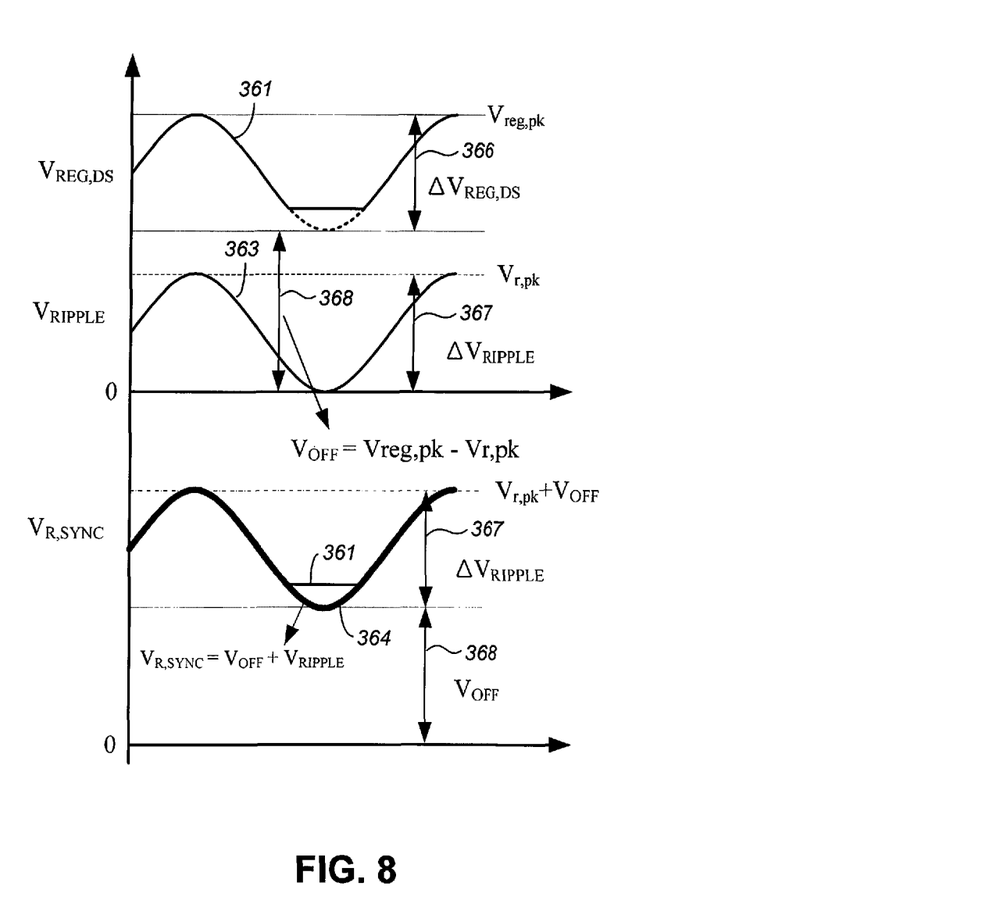
FIG. 8 shows waveforms of signals of the adaptive offset generator of FIG. 7 in accordance with an embodiment of the present invention.

FIG. 8 shows waveforms of signals of the adaptive offset generator 140-1 in accordance with an embodiment of the present invention. FIG. 8 shows the drain-to-source voltage $V_{REG,DS}$ (plot 361), the ripple voltage $V_{RIPPLE}$ (plot 363) where an offset voltage is eliminated and its minimum point is synchronized to zero level by the ripple detector 130, and the reference synchronization voltage $V_{R,SYNC}$ (plot 364) with the offset synthesized by the sum of the offset voltage $V_{OFF}$ and the ripple voltage $V_{RIPPLE}$. Note that the drain-to-source voltage $V_{REG,DS}$ (plot 361) and the reference synchronization voltage $V_{R,SYNC}$ (plot 364) overlap in the example of FIG. 8 for illustration purposes. Further note that the voltage delta (i.e., peak-to-peak amplitude) of the drain-to-source voltage $V_{REG,DS}$ (see 366) and the voltage delta of the ripple voltage $V_{RIPPLE}$ (see 367) are the same. Adding the adaptive offset voltage (see 368) to the ripple voltage $V_{RIPPLE}$ increases the drain-to-source voltage $V_{REG,DS}$ to allow the transistor M1 to operate in the saturation region for reduced ripple current. The offset voltage is adaptively adjusted to limit the increase of the drain-to-source voltage $V_{REG,DS}$, thereby minimizing power dissipation.

Figure 9:
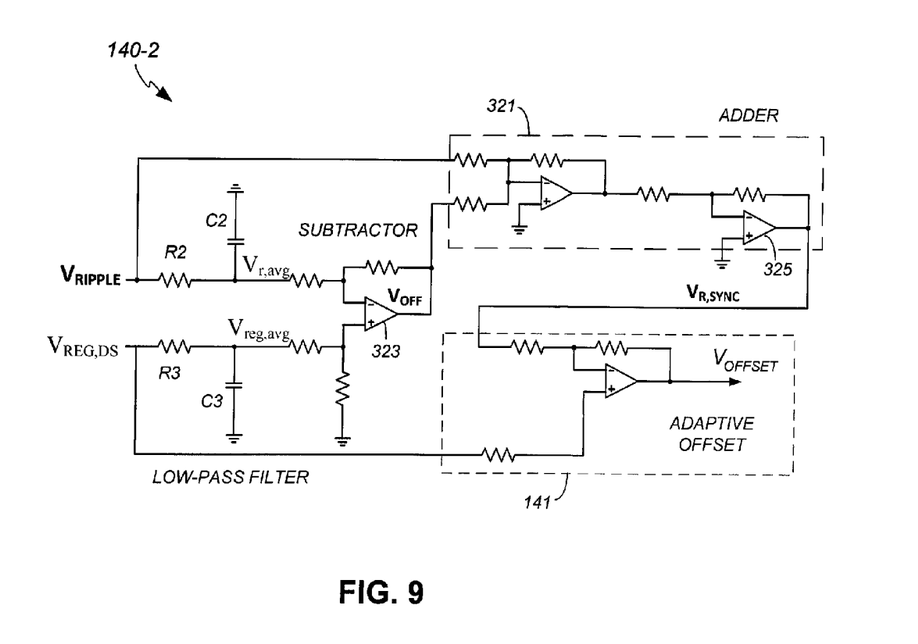
FIG. 9 shows a schematic diagram of an analog adaptive offset generator in accordance with an embodiment of the present invention.

FIG. 9 shows a schematic diagram of an adaptive offset generator 140-2 in accordance with an embodiment of the present invention. The adaptive offset generator 140-2 is an example analog implementation of the adaptive offset generator 140. In the example of FIG. 9, a low pass filter comprising a resistor R2 and a capacitor C2 filters the ripple voltage $V_{RIPPLE}$ to detect the average of the ripple voltage $V_{RIPPLE}$, and another low pass filter comprising a resistor R3 and a capacitor C3 filters the drain-to-source voltage $V_{REG,DS}$ to detect the average of the drain-to-source voltage $V_{REG,DS}$. A subtractor comprising am amplifier 323 subtracts the average of the ripple voltage $V_{RIPPLE}$ from the average of the drain-to-source voltage $V_{REG,DS}$ to generate the offset voltage $V_{OFF}$, which is added to the ripple voltage $V_{RIPPLE}$ by the adder 321 to generate the reference synchronization voltage $V_{R,SYNC}$ at the output of the amplifier 325. The amplifier 141 (see also FIG. 1, 141) receives the reference synchronization voltage $V_{R,SYNC}$ at the negative input terminal and receives the drain-to-source voltage $V_{REG,DS}$ at the positive input terminal to generate the adaptive offset voltage $V_{OFFSET}$.

Figure 10:
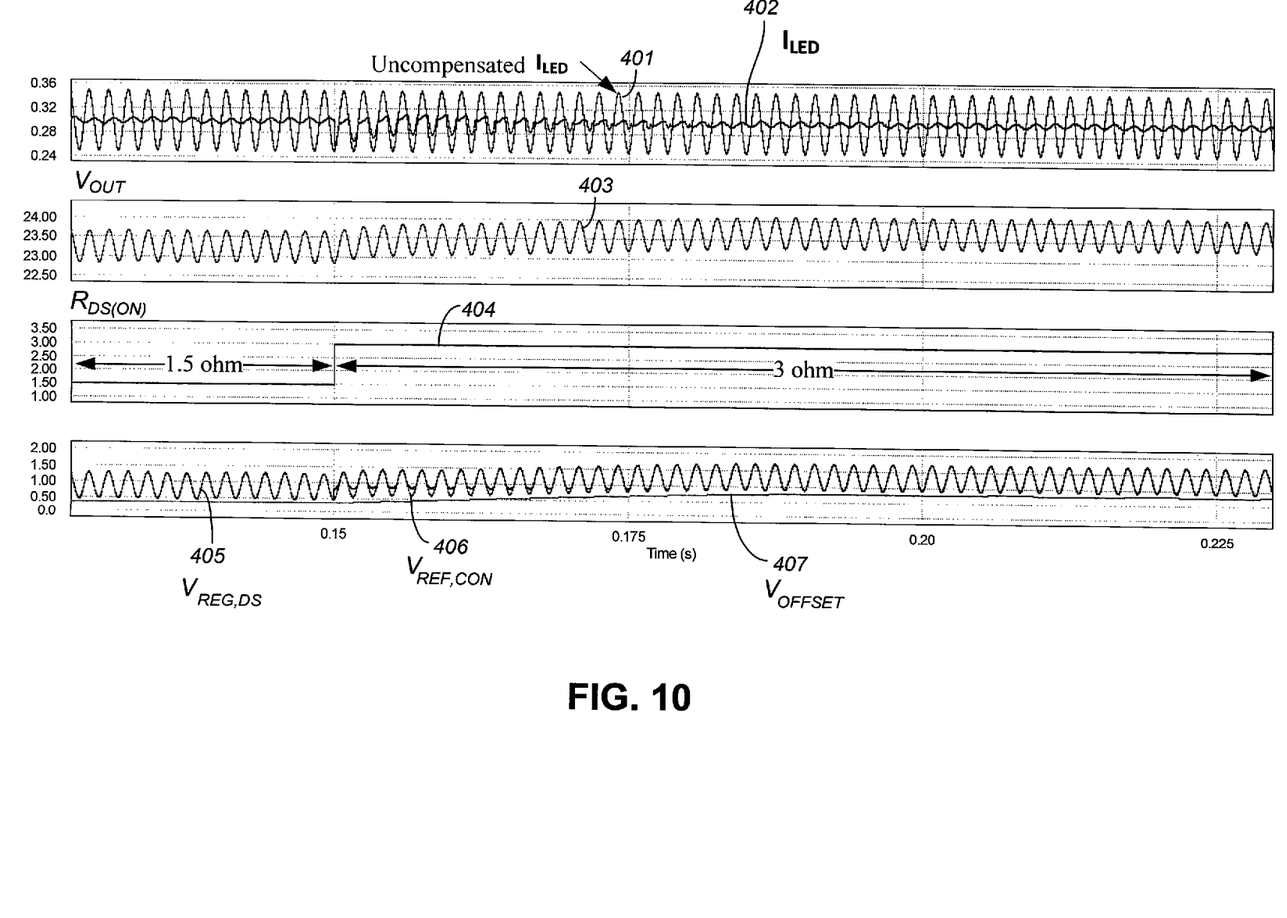
FIG. 10 shows waveforms of signals of the LED lighting circuit of FIG. 1, in accordance with an embodiment of the present invention.

FIG. 10 shows waveforms of signals of the LED lighting circuit 100 of FIG. 1, in accordance with an embodiment of the present invention. FIG. 10 shows the LED current $I_{LED}$ through the LED array 102 (plot 402), the output voltage $V_{OUT}$ (plot 403), the drain-to-source ON resistance ($R_{DS(ON)}$) of the transistor M1 (plot 404), the drain-to-source voltage $V_{REG,DS}$ of the transistor M1 (plot 405), the reference control voltage $V_{REF,CON}$ (plot 406), and the adaptive offset voltage $V_{OFFSET}$ (plot 407). For comparison, FIG. 10 also shows the uncompensated, i.e., without ripple reduction, LED current $I_{LED}$ (plot 401). As shown in FIG. 10, the adaptive offset voltage $V_{OFFSET}$ (plot 407) allows for generation of the reference control voltage $V_{REF,CON}$ (plot 406) such that the transistor M1 operates in the saturation region to reduce ripple current while minimizing power dissipation. It is to be noted that in general the $R_{DS(ON)}$ gradually increases because of thermal effects; $R_{DS(ON)}$ is shown in the example of FIG. 10 as changing rapidly for ease of illustrating its behavior relative to the other signals.

While specific embodiments of the present invention have been provided, it is to be understood that these embodiments are for illustration purposes and not limiting. Many additional embodiments will be apparent to persons of ordinary skill in the art reading this disclosure.

What is claimed is:

1. A light emitting diode (LED) lighting circuit comprising:
   a transistor that is connected to receive an LED current that flows through an LED array;
   a ripple detector that generates a ripple voltage that is indicative of a ripple current;
   an adaptive offset generator that generates an adaptive offset voltage from the ripple voltage and from a voltage on a node of the transistor; and
   a linear regulator that drives the transistor to regulate the LED current in accordance with a control reference voltage that is generated from the ripple voltage and the adaptive offset voltage.

2. The LED lighting circuit of claim 1, wherein the transistor is a metal oxide semiconductor (MOS) transistor, the linear regulator comprises a first amplifier that has a first node connected to a drain of the transistor, a second node that receives the control reference voltage, and an output node that is connected to a gate of the transistor.

3. The LED lighting circuit of claim 1, wherein the transistor is a metal oxide semiconductor (MOS) transistor, the adaptive offset generator generates the adaptive offset voltage based on a difference between the ripple voltage and a drain-to-source voltage of the transistor.

4. The LED lighting circuit of claim 1, wherein the transistor is a metal oxide semiconductor (MOS) transistor, the adaptive offset generator generates the adaptive offset voltage based on a difference between a peak of a drain-to-source voltage of the transistor and a peak of the ripple voltage.

5. The LED lighting circuit of claim 1, further comprising:
an adder that generates the control reference voltage by adding the adaptive offset voltage to the ripple voltage.

6. The LED lighting circuit of claim 1, wherein the ripple detector comprises a high-pass filter.

7. The LED lighting circuit of claim 1, wherein the ripple detector comprises:
a minimum detector that detects a minimum value of an output voltage at an output capacitor to which the LED array is connected; and
a subtractor that subtracts the minimum value of the output voltage from the output voltage.

8. The LED lighting circuit of claim 1, further comprising:
a power factor correction circuit that generates a source current that flows to an output capacitor to which the LED array is connected.

9. The LED lighting circuit of claim 1, wherein the transistor is a metal oxide semiconductor (MOS) transistor, and wherein the adaptive offset generator comprises:
a first peak detector that detects a peak of the ripple voltage;
a second peak detector that detects a peak of a drain-to-source voltage of the transistor;
an adder that adds the ripple voltage to a difference between the peak of the drain-to-source voltage of the transistor and the peak of the ripple voltage to generate a reference synchronization voltage; and
an amplifier that receives the reference synchronization voltage and the drain-to-source voltage of the transistor to generate the adaptive offset voltage.

10. The LED lighting circuit of claim 1, wherein the transistor is a metal oxide semiconductor (MOS) transistor, and wherein the adaptive offset generator comprises:
a first low-pass filter that filters the ripple voltage to generate an average of the ripple voltage;
a second low-pass filter that filters a drain-to-source voltage of the transistor to generate an average of the drain-to-source voltage of the transistor;
a subtractor that generates a difference between the average of the ripple voltage and the average of the drain-to-source voltage of the transistor;
an adder that adds the ripple voltage to the difference between the average of the ripple voltage and the average of the drain-to-source voltage of the transistor to generate a reference synchronization voltage; and
an amplifier that subtracts the reference synchronization voltage from the drain-to-source voltage of the transistor to generate the adaptive offset voltage.

11. A ripple reducer circuit comprising:
a ripple detector that is connected to an output capacitor, the ripple detector being configured to generate a ripple voltage that is indicative of a ripple current;
an adaptive offset generator that is connected to the ripple detector to receive the ripple voltage, the adaptive offset generator being configured to generate an adaptive offset voltage from the ripple voltage and from a signal on a first terminal of a metal oxide semiconductor (MOS) transistor; and
a linear regulator having an output node that is connected to a second terminal of the MOS transistor, a first input node that is connected to the first terminal of the MOS transistor, and a second input node that receives a control reference voltage that is generated from the ripple voltage and from the adaptive offset voltage, the linear regulator being configured to regulate a regulated current in accordance with the control reference voltage.

12. The ripple reducer circuit of claim 11, wherein the regulated current flows through a light emitting diode (LED) array.

13. The ripple reducer circuit of claim 11, wherein the linear regulator comprises a first amplifier that has the first input node connected to a drain of the MOS transistor, the second input node that receives the control reference voltage, and the output node that is connected to a gate of the MOS transistor.

14. The ripple reducer circuit of claim 11, wherein the ripple detector comprises:
a minimum detector that detects a minimum value of an output voltage at the output capacitor; and
a subtractor that subtracts the minimum value of the output voltage from the output voltage.

15. The ripple reducer of claim 11, wherein the adaptive offset generator comprises:
a first peak detector that detects a peak of the ripple voltage;
a second peak detector that detects a peak of a drain-to-source voltage of the MOS transistor;
an adder that adds the ripple voltage to a difference between the peak of the drain-to-source voltage of the MOS transistor and the peak of the ripple voltage to generate a reference synchronization voltage; and
an amplifier that receives the reference synchronization voltage and the drain-to-source voltage of the MOS transistor to generate the adaptive offset voltage.

16. The ripple reducer circuit of claim 11, wherein the adaptive offset generator comprises:
a first low-pass filter that filters the ripple voltage to generate an average of the ripple voltage;
a second low-pass filter that filters a drain-to-source voltage of the MOS transistor to generate an average of the drain-to-source voltage of the MOS transistor;
a subtractor that generates a difference between the average of the ripple voltage and the average of the drain-to-source voltage of the MOS transistor;
an adder that adds the ripple voltage to the difference between the average of the ripple voltage and the average of the drain-to-source voltage of the MOS transistor to generate a reference synchronization voltage; and
an amplifier that subtracts the reference synchronization voltage from the drain-to-source voltage of the MOS transistor to generate the adaptive offset voltage.

17. A method of reducing ripple in a light emitting diode (LED) lighting circuit, the method comprising:
detecting a ripple current;
generating an adaptive offset based on a voltage on a node of a transistor and based on the ripple current;
generating a reference control signal based on the adaptive offset and based on the ripple current; and
driving the transistor in accordance with the reference control signal to control an LED current that flows through an LED array.

18. The method of claim 17, wherein the transistor is a metal oxide semiconductor (MOS) transistor, and wherein driving the transistor in accordance with the reference control signal to control the LED current comprises:
receiving a drain-to-source voltage of the transistor at a first input of an amplifier;
receiving a voltage of the reference control signal at a second input of the amplifier; and
driving a gate of the transistor with an output of the amplifier.

19. The method of claim 17, wherein the transistor is a metal oxide semiconductor (MOS) transistor, and wherein generating the adaptive offset comprises:
  detecting a difference between a drain-to-source voltage of the transistor and a ripple voltage indicative of the ripple current.

20. The method of claim 17, further comprising generating a source current for providing the LED current.

\* \* \* \* \*